United States Patent

[11] 3,575,469

[72] Inventor Frank L. Meyer
Houston, Tex.
[21] Appl. No. 815,369
[22] Filed Apr. 11, 1969
[45] Patented Apr. 20, 1971
[73] Assignee Shell Oil Company
New York, N.Y.

[54] GAS INJECTION ARRANGEMENT FOR PREVENTING PIPELINE SLUMPING
6 Claims, 4 Drawing Figs.
[52] U.S. Cl. .................................................. 302/14, 302/64, 302/66
[51] Int. Cl. ....................................................... B65g 53/30
[50] Field of Search ........................................... 302/29, 14, 15, 16, 64, 53, 66

[56] References Cited
UNITED STATES PATENTS
562,232  6/1896  Miller ........................... 302/14
3,105,736  10/1963  Groves ......................... 302/29

*Primary Examiner*—Andres H. Nielsen
*Attorneys*—Thomas R. Lampe and J. H. McCarthy

ABSTRACT: Method and apparatus for preventing downhill slumping in a shutdown slurry pipeline. Upon shutdown of the pipeline, a gas is injected into the line at selected locations to fluidize the solids, thereby preventing the formation of solid particle plugs in the low regions of the line. If insufficient gas is injected to fluidize the settling solids, a channel will be formed in the upper portion of the pipe which will enable flow and pressure transmission for resuspending the solids upon restart.

The present invention relates to pipeline transport operations; and more particularly, to a method and apparatus for preventing the downward movement of slurry solids in an inclined portion of pipeline during a shutdown period and for the plugging of the pipeline by said solids particles.

Transportation by pipeline is a major and growing industry. With the use thereof formerly confined almost entirely to movement of water, gas and petroleum products, pipelines, with the advent of slurry transport, have become useful for long and short hauls of a wide variety of raw materials and finished products.

With respect to the pipeline transportation of materials in slurry form, problems may arise when such materials are moved through pipelines inclined to go over a hill or down into a valley of such inclination to cause slumping. At these locations, during a planned or emergency line shutdown, the solids of the transported slurry may settle out vertically and subsequently slump down the inclined portions of the pipeline, thereby causing a compacted plug which may be very difficult to dislodge and move when line shutdown is terminated and transport activities are attempted.

These difficulties are most commonly avoided by laying solids-carrying or slurry pipelines so that they do not exceed a slope or angle of inclination below which slumping does not occur. Alternatively, the inclined pipeline sections are emptied or flushed of solids at each shutdown. Obviously, these alternative prior art approaches are not always feasible or economical, especially in those situations where long and relatively steep slopes are encountered. Slopes of this nature are being encountered with increasing frequency as pipeline operations are being extended to new relatively inaccessible mountainous areas in the United States and elsewhere.

PATENTED APR 20 1971 3,575,469

INVENTOR:
F. L. MEYER
BY: Thomas R. Lampe
HIS ATTORNEY

GAS INJECTION ARRANGEMENT FOR PREVENTING PIPELINE SLUMPING

SUMMARY OF THE INVENTION

It is therefore a primary object of the present invention to provide an improved and economical apparatus and method whereby slurry material being transported in an inclined pipeline section is prevented from slumping during a line shutdown or if slumping is allowed, provisions are made to provide a channel above the slumped bed of particulate solid material.

This, as well as other objects, have been attained in the present invention by providing a method and apparatus for preventing downhill slumping in a shutdown slurry pipeline wherein a gas, such as methane or $N_2$, is injected into a shutdown pipeline at preselected locations in sufficient quantities to fluidize the slurry in the line. The gas is vented at upper elevations of the line. If insufficient quantities of the gas are available for complete fluidization of the slurry plug, then the solid phase of the slurry will settle to the bottom of the pipe but a small channel will be provided by the gas slowly rising up the inclined portions of the pipe. This open channel will, upon restart, allow uninterrupted pressure transmittal downstream and enable the pipeline to be slowly restarted.

DESCRIPTION OF THE DRAWING

The above-noted and other objects of the present invention will be understood from the following description, taken with reference to the accompanying drawing. In describing the invention in detail, reference will be made to the drawing in which like reference numerals designate corresponding parts throughout several views in which:

Referring now to FIG. 1, a given length of slurry pipeline 11 is illustrated in the position assumed thereby as the pipeline proceeds to and from a valley formed between two hills or mountains 12 and 13. The terrain illustrated is typical of that encountered in pipeline laying activities, although it should be understood that the teachings of the present invention may be carried out in any topographical configuration wherein a portion of slurry pipeline is inclined at such locations as highways, rivercrossings, ditches, gulleys, etc.

Figure 1:
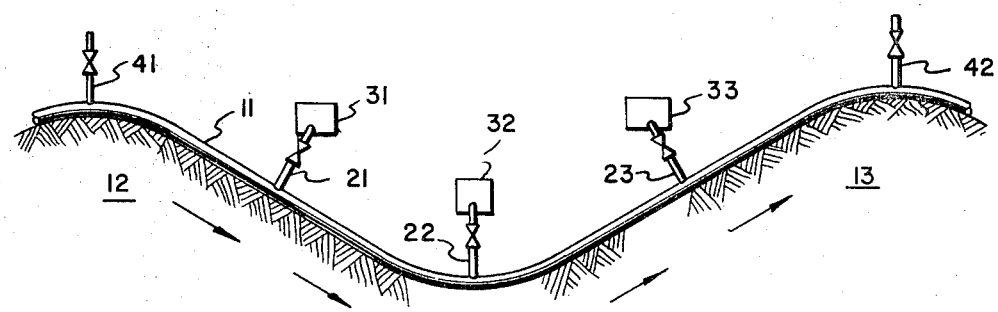
FIG. 1 is a diagrammatic view illustrating a given length of slurry pipeline which has been modified in accordance with the teachings of the present invention.

The transportation of slurries consisting of solid particles in a fluid medium by use of pipelines similar to that disclosed in FIG. 1 is quite well known, and such expedient is finding increasing use, especially in those situations where the source of raw materials is relatively remote and inaccessible from the point of delivery, which may be a suitable processing plant, for example. In the disclosed arrangement, it may be assumed for purposes of illustration that the slurry material being transferred through pipeline 11 as by means of conventional pumps (not shown) is moving through the line in the direction indicated by the arrows. However, the teachings of the present invention are, of course, applicable regardless of the direction of flow of the slurry.

As long as flow continues in the pipeline, the solid matter of the slurry will remain in suspension or semisuspension when being transported by saltation within the pumped liquid, even when the solid matter has a higher specific gravity than the liquid. If, however, the flow is stopped for any reason, i.e., the pipeline is shut down, such solid matter will settle out of suspension. In the situation where the line is horizontal or the slope of the line is insufficient to cause sliding of the settled solids, no problem is created by such settling out. Under these conditions, a liquid-rich channel remains open at the top of the line which allows the settled material to be resuspended with a minimum of difficulty upon resumption of flow.

A serious problem can exist when the pipeline must be inclined to go over a hill or down a valley, as illustrated, for example, in FIG. 1. At these locations, the settling of solids followed by their sliding down the slope during a protracted shutdown can result in a compacted plug of material difficult or impractical to move or resuspend. In the illustrated pipeline configuration, such solids would slide downwardly into the valley formed between hills or mountains 12 and 13. The solid material would then compress under its own weight to form a plug in the valley in an obvious manner.

Such plug formation is prevented in accordance with the teachings of the present invention as follows.

Disposed along pipeline 11 at preselected locations are a plurality of inlet pipes 21, 22 and 23. While only three such pipes are illustrated in FIG. 1 it is to be understood that the number of such pipes employed in carrying out the teachings of the present invention will depend on the requirements of a given situation as, for example, upon the degree of inclination or length of the pipeline, the type of slurry material being transported, etc. Inlet pipes 21 and 23 are shown as being disposed in operative association with inclined portions of the pipeline, while inlet pipe 22 is positioned at the lowermost part of the pipeline disposed between hills or mountains 12 and 13. Each of the inlet pipes 21, 22 and 23 is operatively connected to a suitable gas supply source indicated respectively by means of reference numerals 31, 32 and 33. The gas supply sources may be of any suitable commercial type, such as gas cylinders or tanks. Alternatively, the inlet pipes may all be connected to a central gas supply source such as a local gas field facility. The gas conveyed through inlet pipes may be of any type such as methane, nitrogen, etc., but it is desirable that the type of gas utilized by chemically inert insofar as the slurry material in the pipeline 11 is concerned. Located at or near the top or uppermost portions of pipeline 11, i.e., those portions of the pipe lying at the summits of hills or mountains 12 and 13, are vent pipes 41 and 42.

Figure 2:
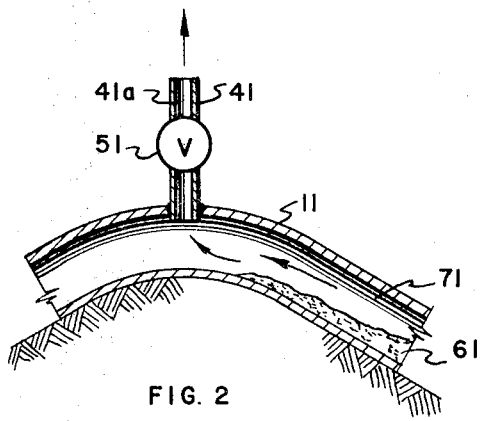
FIGS. 2 through 4 are enlarged cross-sectional views in longitudinal projection illustrating selected portions of the pipeline section of FIG. 1 with vent or injection pipes in operative association therewith in accordance with the teachings of the present invention.
Figure 3:
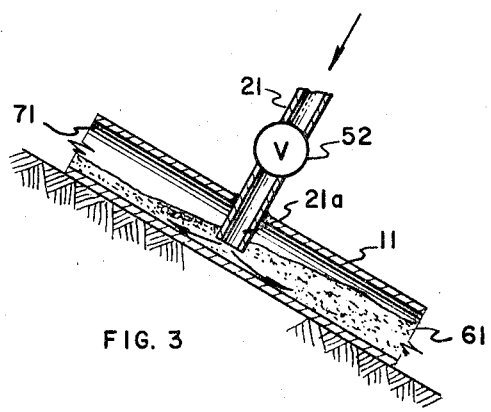
Figure 4:
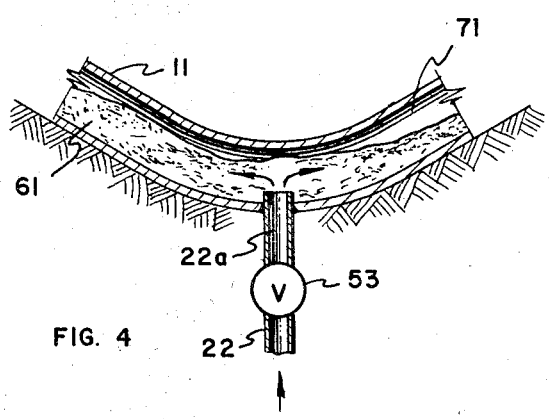

FIGS. 2, 3 and 4 illustrate certain portions of pipeline 11 in cross section and reference may be had to these FIGS. for a further understanding of the cooperative relationship between the pipeline, the inlet pipes, and the vent pipes utilized in carrying out the teachings of the present invention. With respect to FIG. 2, vent pipe 41 is illustrated as being fixedly positioned at or near an apex portion of pipeline 11 as by being welded thereto. Vent pipe 41 defines a throughbore 41a which provides communication between the interior of pipeline 11 and the ambient atmosphere or special venting tanks, containers or separators. A valve 51, which may be of any suitable construction, is positioned in vent pipe 41 so that flow through the vent pipe may be permitted or halted as desired. It should be noted that the lower end of vent pipe 41 lies at or near the top inner surface of pipeline 11.

Inlet pipes 21 and 22 (FIGS. 3 and 4) are also fixedly secured to pipeline 11 as by means of welding. Inlet pipe 21 is located near an inclined portion of pipeline 11 while inlet pipe 22 is illustrated as being secured to that portion of the pipeline lying at the lowermost point between hills or mountains 12 and 13. Inlet pipes 21 and 22 may terminate at their lowermost ends near the bottom inner surface of pipeline 11 or may terminate flush with the top inner surface of the pipeline to permit passing scrapers. The inlet pipes 21 and 22 define throughbores 21a and 22a, respectively, which provide fluid flow communication between the interior of pipeline 11 and gas supply sources 31 and 32 (FIG. 1). A valve is disposed in each of the inlet pipes as at 52 and 53, whereby fluid flow through the pipelines may be selectively either terminated or allowed.

As slurry material flows through pipeline 11 in the course of ordinary transport activities, valves 51, 52 and 53, as well as the valves associated with the other vent and inlet pipes, are maintained in a closed position so that slurry material will not flow out of the pipeline through these pipes. If automation is desirable, then if for any reason the pipeline is closed down and slurry flow terminates, a suitable mechanism (not shown) senses the drop in flow rate or some other indicator within the pipeline below a predetermined minimum value and through any suitable arrangement opens the valves in the inlet and vent pipes substantially simultaneously. Gas then flows through the inlet pipes into the interior of the pipeline with the gas flow path being illustrated, for example, by means of the arrows in FIGS. 3 and 4. If sufficient quantities of gas are available the slurry 61 in the pipeline 11 will remain in a completely fluidized condition with the solid phase of the slurry being maintained in a suspended condition with respect to the liquid phase thereof, due to the agitating effect of the gas as it passes from the bottoms of the inlet pipes and upwardly through the slurry. The gas would gradually work its way upward along the top inner surface of the pipeline to exit into the atmosphere through vent pipes such as pipe 41 (FIG. 2).

In all probability, however, insufficient quantities of gas will be available to permit the slurry to be maintained in a completely fluidized condition. This is particularly true where cylinders or tanks are used as the source of gas supply. In this event some slumping of the solid phase of the slurry material will occur since the slurry will not be agitated violently enough by the gas to keep the solid phase of the slurry in suspension within the liquid phase thereof. However, even though the solids tend to settle at the bottom of the pipeline, formation of a solid plug in the line will be prevented since a channel will be formed by the gas between the top inner surface of the pipeline and the slurry material or slurry components as the gas rises upwardly from the locations of the inlet pipes to the vent pipes. As may clearly be seen with reference to FIGS. 2-—4, the size of the gas channel (indicated by reference numeral 71) increases as the pipeline progresses upwardly.

When pipeline flow is recommenced, through the teachings of the present invention the slurry material may thus be in either (1) a fully fluidized condition through the injection of relatively large quantities of gas into the pipeline, or (2) some slumping of the solid phase of the slurry may have occurred upon the injection of lesser quantities of gas in the line. In either condition, however, the resumed flow of the slurry is promoted upon pipeline restart. In the first condition, no slumping at all will have occurred while in the second condition total plugging of the line is prevented due to the formation of a gas channel which allows expansion of the solid phase slurry material as it is pumped out of the low point of the line, thereby permitting ready remixing of the solid phase and the liquid phase during renewal transport thereof. It is, of course, to be understood that the valves in the inlet and vent pipes are restored to a closed position promptly upon restart of the pipeline.

I claim:

1. Apparatus for carrying a slurry material, including a liquid phase and a solid phase, said apparatus being adapted to minimize restart pressure in a shutdown pipeline carrying said material, said apparatus comprising:

a pipeline defining an interior, said pipeline being inclined to the horizontal over at least a portion of its length and including an uppermost portion at one end of said inclined portion and a lowermost portion at the other end of said inclined portion where slumping of said solid phase is likely to occur;

means for selectively introducing a gas into the interior of said pipeline at both said inclined portion and said lowermost portion to at least partially fluidize the slurry material when the pipeline flow rate has dropped below a predetermined minimum value to prevent the formation of a slurry material plug in the lowermost portion of the pipeline due to slumping; and means disposed at the uppermost portion of the pipeline to selectively vent gas introduced into the interior of the pipeline at both said inclined portion and said lowermost portion.

2. The apparatus of claim 1 wherein said means for introducing a gas into the interior of the pipeline comprises at least one inlet pipe providing fluid flow communication between the pipeline interior and a source of gas and further including valve means operatively associated with said inlet pipe.

3. The apparatus of claim 1 wherein said means for introducing a gas into the interior of the pipeline comprises a plurality of inlet pipes providing fluid flow communication between the pipeline interior and a source of gas, at least one of said inlet pipes positioned at the lowermost portion of the pipeline and at least one of said inlet pipes positioned along the inclined portion of said pipeline.

4. The apparatus of claim 3 wherein the inlet pipes terminate with the pipeline near the lower inner surface of the pipeline.

5. The apparatus of claim 4 wherein said means to vent gas comprises a pipe projecting into the interior of the uppermost portion of the pipeline and terminating near the upper inner surface thereof.

6. A method for minimizing restart pressure in a shutdown pipeline by preventing downhill slumping of a solid phase of a slurry material transported by said pipeline, said slurry material including a solid phase and a liquid phase, said pipeline being inclined to the horizontal over at least a portion of its length and including an uppermost portion at one end of said inclined portion and a lowermost portion at the other end of said inclined portion, where slumping of said solid phase is likely to occur, said method comprising the steps of:

terminating slurry flow in said inclined portion of the pipeline; and thereafter selectively injecting gas into the interior of the pipeline at both said inclined and said lowermost portion to at least partially fluidize the slurry material to prevent the formation of a plug in the pipeline due to slumping by gravity of the slurry material solid phase to said lowermost portion; and venting the gas from the pipeline after at least partial fluidization of the slurry material has occurred at said uppermost portion.